Nov. 20, 1956     I. F. CLARK     2,771,123
COLLAPSIBLE ARMRESTS FOR AUTOMOBILE SEAT CUSHIONS AND THE LIKE
Filed Sept. 13, 1954     4 Sheets-Sheet 1

INVENTOR.
Ivan Freeman Clark
BY
Attorney.

Nov. 20, 1956  I. F. CLARK  2,771,123
COLLAPSIBLE ARMRESTS FOR AUTOMOBILE SEAT CUSHIONS AND THE LIKE
Filed Sept. 13, 1954  4 Sheets-Sheet 2
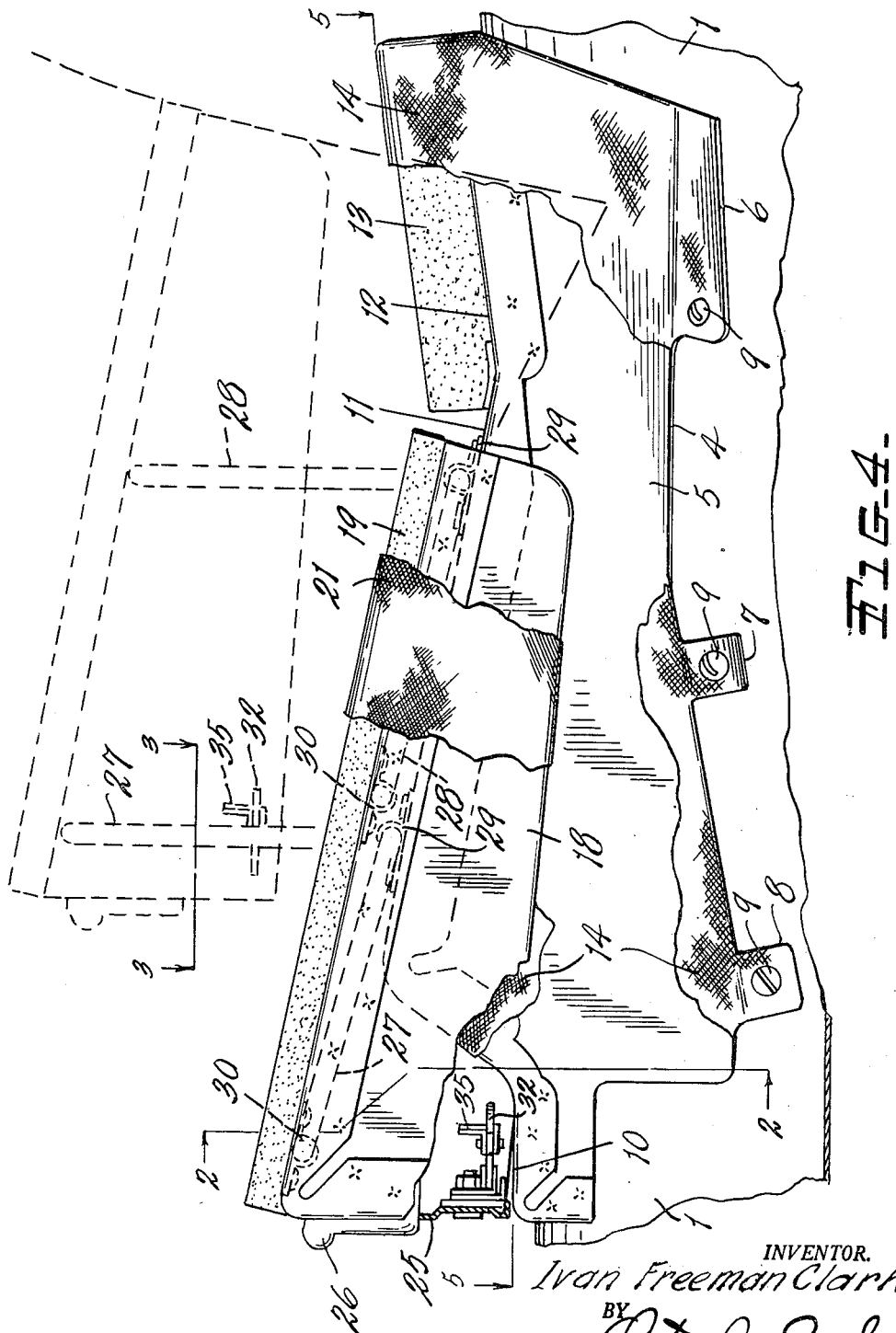
INVENTOR.
Ivan Freeman Clark
BY
Attorney

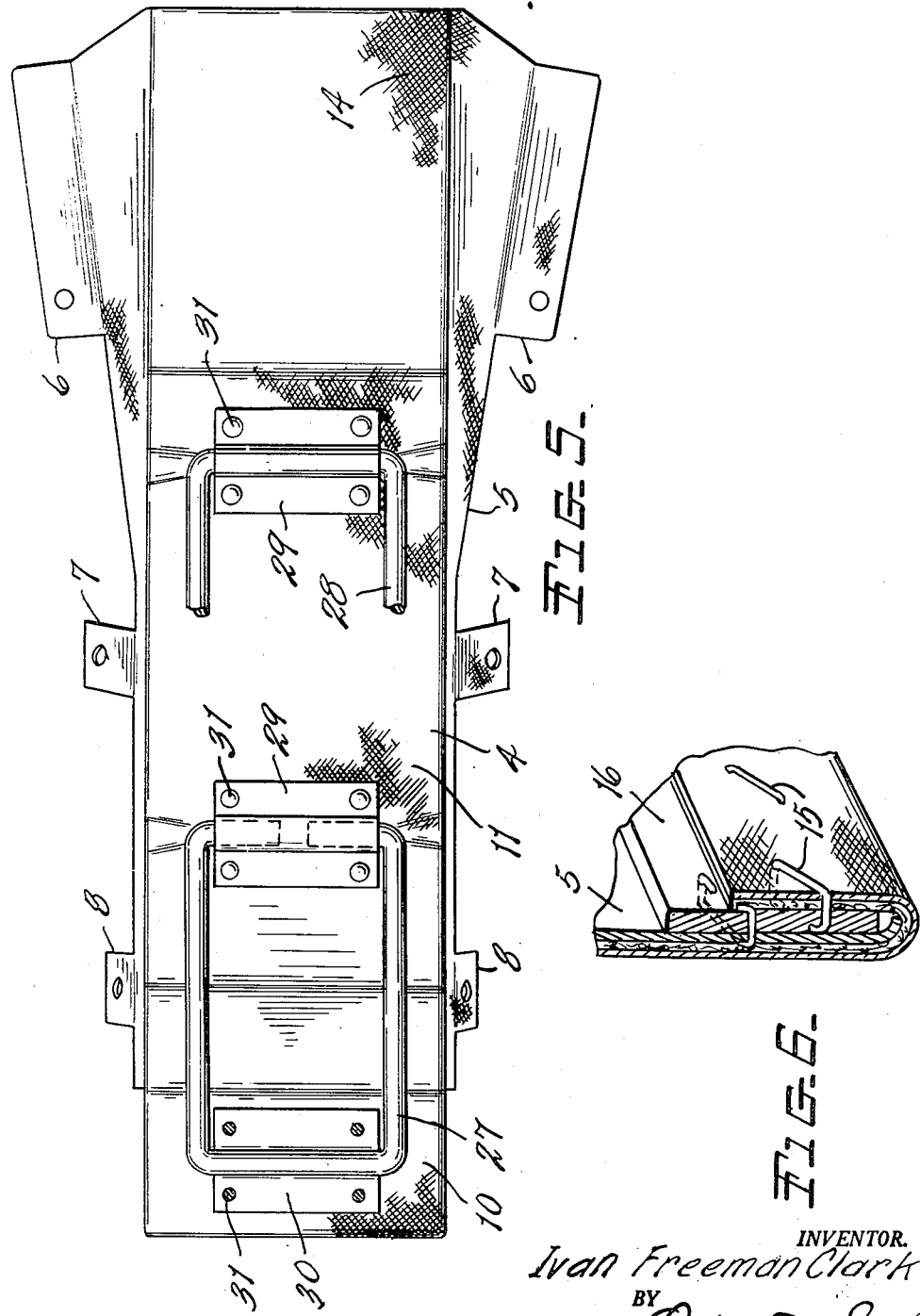

Nov. 20, 1956 I. F. CLARK 2,771,123
COLLAPSIBLE ARMRESTS FOR AUTOMOBILE-SEAT CUSHIONS AND THE LIKE
Filed Sept. 13, 1954 4 Sheets-Sheet 4
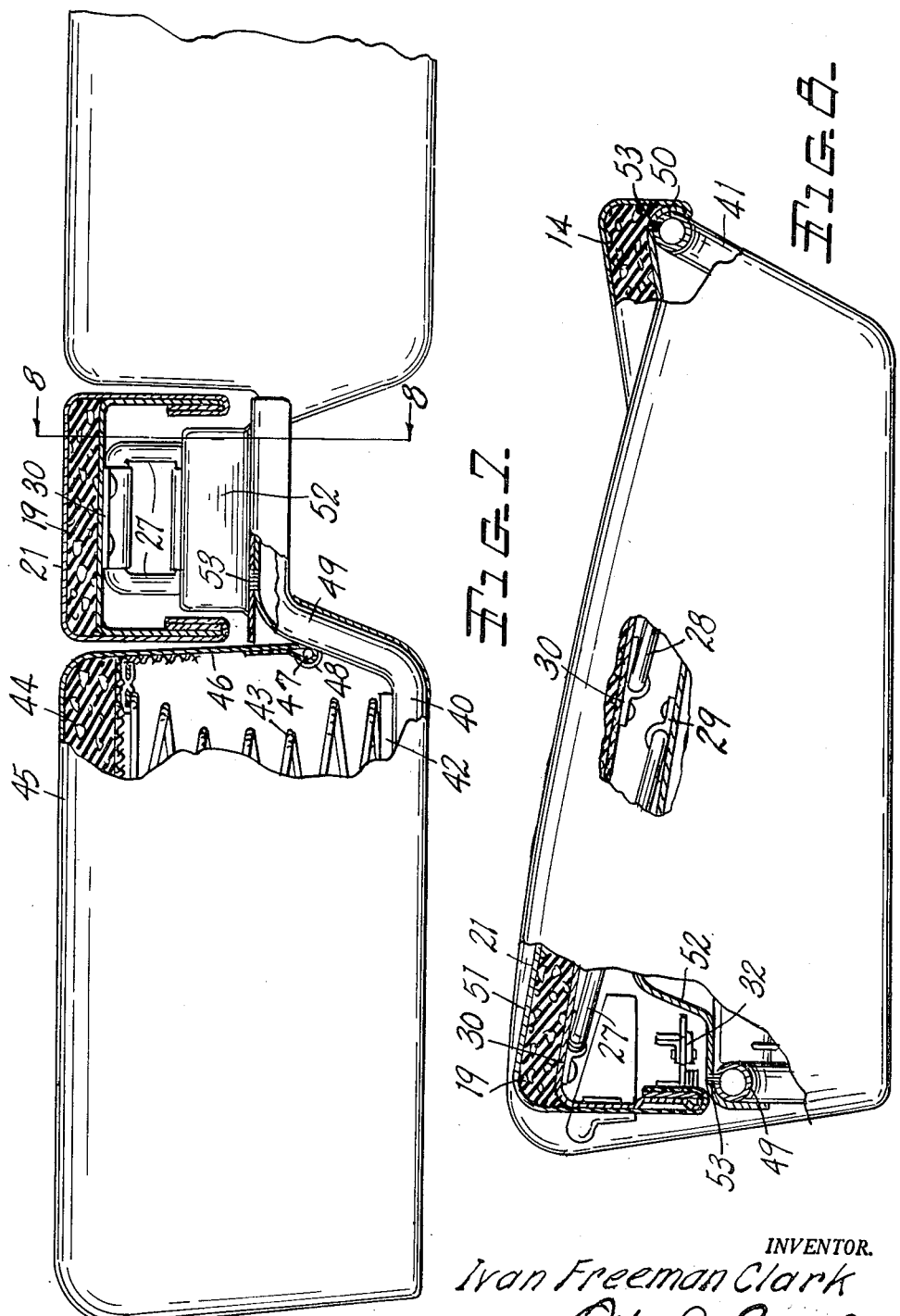
INVENTOR.
Ivan Freeman Clark
By Otis A. Earl
Attorney.

United States Patent Office 2,771,123
Patented Nov. 20, 1956

2,771,123

COLLAPSIBLE ARMRESTS FOR AUTOMOBILE SEAT CUSHIONS AND THE LIKE

Ivan Freeman Clark, Lyons, Mich., assignor to Ivan Clark Manufacturing Company, Lyons, Mich.

Application September 13, 1954, Serial No. 455,636

7 Claims. (Cl. 155—112)

This invention relates to a collapsible arm rest for automobile seat cushions and the like which when collapsed is flush with the cushion and may be upholstered to correspond with the upholstery thereof.

The main objects of this invention are

First, to provide a collapsible arm rest for automobile seat cushions which may be readily installed in supported relation to the bottom of a vehicle body independently of the seat cushions and readily erected or collapsed and when in collapsed position is substantially flush with the seat cushions at the sides thereof.

Second, to provide an arm rest for automobile seat cushions which is attractive in appearance both when in erected position and when in collapsed position.

Third, to provide an arm rest structure having these advantages, which is automatically locked in erected position but may be readily released for collapsing.

Fourth, to provide an arm rest structure having these advantages which is capable of sustaining a heavy load when in erected position and at the same time one which is simple and economical in its parts and easy to operate.

Further objects and advantages of my invention will be apparent from a consideration of the following description and claims. The drawings, of which there are three sheets, illustrate a preferred form of apparatus for performing my invention, and the steps involved in the method.

Fig. 4 is a fragmentary side elevational view with the arm rest shown in collapsed position by full lines, and in erected position by dotted lines, a portion of a floor of a motor vehicle being conventionally illustrated.

Fig. 5 is a plan view of the base portion of my arm rest with the arm rest supporting links collapsed thereon, one of the arm rest supporting links being partially broken away, the attaching clip for the other link to the arm rest illustrated with the attaching rivets therefor being shown in section.

Fig. 6 is an enlarged fragmentary perspective view in vertical section illustrating the manner of attaching the upholstery covering to the arm rest.

Fig. 7 is a fragmentary front elevational view of a unitary combined seat cushion and arm rest structure embodying my invention.

Fig. 8 is a fragmentary and elevational view, partially in vertical transverse section on a line corresponding to line 8—8 of Figure 7.

Figure 1:
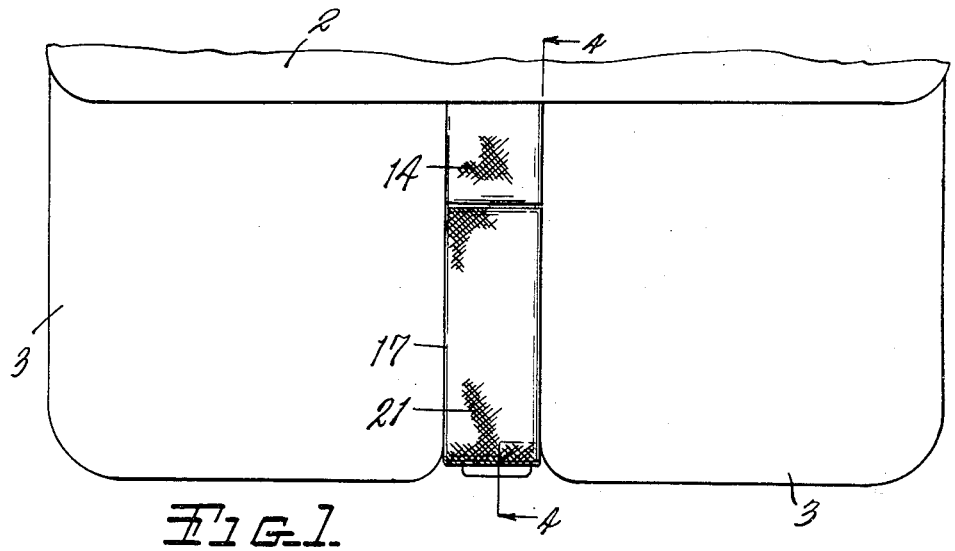
Fig. 1 is a fragmentary plan view of a seat structure embodying my invention.

In the accompanying drawing 1 represents the raised portion of a floor of a motor vehicle, such as an automobile, quite commonly used to provide a housing for the propeller shaft of the vehicle. 2 represents a seat back cushion and 3 latterly spaced seat cushions. Structural details of these cushions 2 and 3 are not illustrated as they form no part of the present invention other than that the sections 3—3 are spaced to receive the arm rest structure of my invention between them. The embodiment of my invention illustrated comprises an elongated base 4 of downwardly facing channel section, its side walls 5 being spaced to receive the upper portion of the bottom member 1 between them. The side walls 5 terminate in attaching ears 6, 7 and 8 which lap upon the sides of the bottom member 1 and are secured thereto as by the screws 9.

The base member is desirably formed of sheet metal stock and has an upwardly and forwardly opening recess 10 in its front end, a rearwardly inclined flat faced front portion 11, and a forwardly inclined flat faced rear portion 12 merging into the rearwardly inclined front portion 11. The forwardly inclined rear portion 12 is provided with resilient padding or upholstery material 13. A fabric covering 14 is disposed over this padding 13 and extended over the side walls of the base member and wrapped around the lower edges thereof and secured to the inner sides thereof by means of staple like fasteners 15 driven into the tacking strips 16 disposed on the inner sides of the side walls and extending longitudinally thereof.

Figures 2, 3:
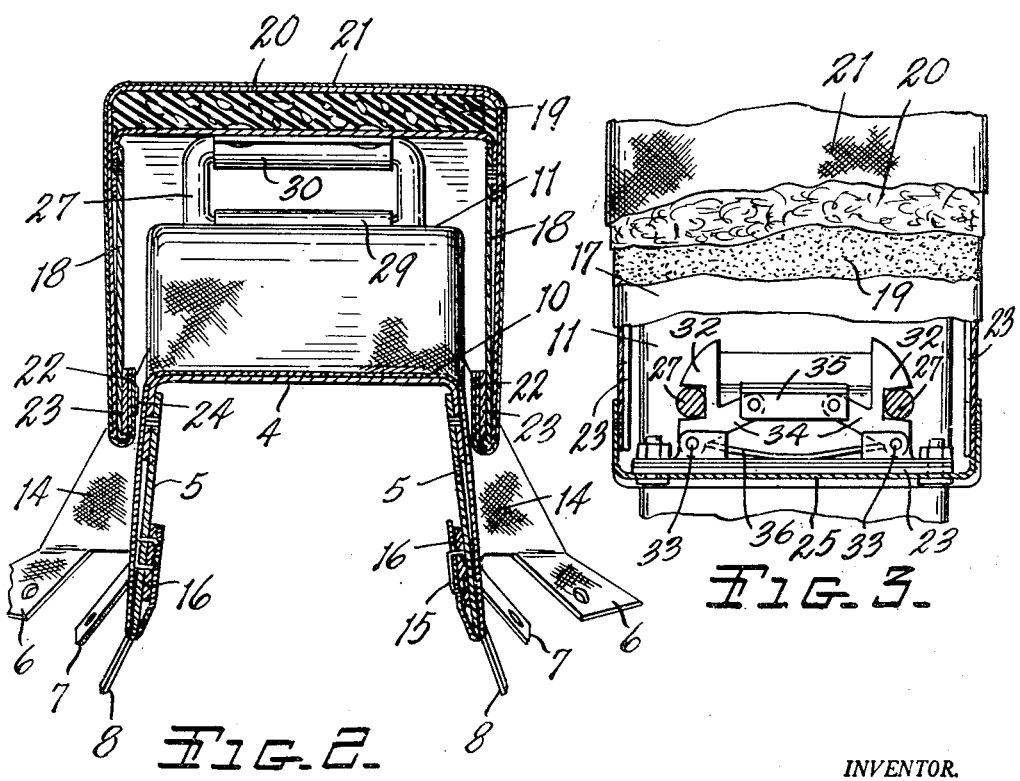
Fig. 2 is a transverse section on a line 2—2 of Fig. 4.
Fig. 3 is a fragmentary plan view partially in section on a line corresponding to line 3—3 of Fig. 4.

The body 17 of the arm rest is of downwardly facing channel section and of such dimensions that its side walls 18 telescopingly embrace the upper portion of the front end of the base when the arm rest is in collapsed position as is illustrated in Figs. 2 and 4. The arm rest is provided with padding 19 disposed on the rearwardly inclined top surface thereof, the lining 20 being arranged over the padding. As illustrated, the upholstery padding 13 and 19 are formed of sponge rubber. However, it is to be understood that the padding may be of any desired material, but sponge rubber is desirable as it does not become bunched or displaced in use. The upholstery covering 21 is arranged over the padding material and extended onto the sides of the arm rest with its edges turned inwardly at 22 and secured to the tacking strips 23 provided on the inner sides of the side walls 18 by means of staples 24, commonly called "stitches."

The rear end of the arm rest when in collapsed position is closely adjacent to and aligned with the upholstery on the rear end of the base and when in erected position the arm rest overhangs the upholstered rear end of the base, as is shown by dotted lines in Fig. 4.

At its front end the arm rest is provided with a front wall 25 which closes the recess 10 in the front end of the base when the arm rest is in collapsed position. The arm rest is provided with a finger piece 26 at its front end. The arm rest is swingably supported by means of laap-like links 27 and 28 which are pivotally connected to the top of the base by means of the clips 29 which are desirably secured to the base over the covering thereon. The links are connected to the underside of the top of the arm rest by means of clips 30, the securing means for the clips 29 and 30 being indicated at 31.

To support the arm rest in erected position, I provide automatically engageable catches 32 which are pivoted on the inner side of the front wall at 33 and provided with inwardly projecting arms 34 connected by the link 35 which constitutes a finger piece. The bowed blade spring 36 is disposed in supported relation to the front wall with its ends engaging the catches, as best shown in Fig. 3. When the arm rest is swung to erected position the catches automatically engage the side portions of the front link 27. The links are connected to the base and to the arm rest in parallel relation so that the arm rest swings freely from collapsed to erected position and vice versa. The upholstery on the base and arm rest not only compliment each other but compliment the cushions 3 when the arm rest is in collapsed position. The covering on the base may be the same as that on the arm rest and the same as the cushion upholstery covering so that when the arm rest is in erected position the exposed parts of the base harmonize with the surrounding cushion parts. The arm rest and the base may be assembled as a unit to be installed as such. It is to be understood that the base is modified to fit the particular floor structure on which it is to be mounted.

The structure illustrated in Figs. 1 to 6 is designed to be mounted on the floor structure between cushions 3, while in Figs. 7 and 8 I illustrate an embodiment in a combined cushion and arm rest structure. In this embodiment the base frame of the unitary combined seat cushion and arm rest structure comprises front frame member 40 and rear frame member 41. A spring support 42 is provided for the helically coiled springs 43. Details of the mounting of these springs and their arrangement form no part of this invention and therefore are not illustrated or described. The upholstery padding 44 is mounted on the springs and provided with an upholstery covering 45 which is secured to the base frame. Two spring units are disposed in latterly spaced relation to permit the positioning of the arm rest between them. The inner ends of the skirt portions 46 of the upholstery coverings are secured to rods 47 by means of hog rings or clips 48. The rods 47 are extended between the upwardly offset arm rest supports 49 and 50 of the front and rear base members. The arm rest designated generally by the numeral 51 is substantially that before described with the exception that the arm rest supporting base 52 is modified to adapt it for mounting on the supports 49 and 50, to which it is fixedly secured by welds 53. The rear portion of the arm rest supporting base is inclined forwardly to support the upholstery padding 14. The arm rest is mounted on the base 52 by means of loop-like links 27 which are connected thereto by the clips 29 and to the underside of the arm rest by the clips 30, as previously described, the upholstery covering of the arm rest is secured thereto in the manner previously described.

When the arm rest is collapsed its surface is substantially in the plane of the normal surfaces of the cushion units. However, it may be raised to the erected position relative thereto, as is the case with the embodiment of Figs. 1 to 6, inclusive.

I have illustrated and described my invention in a highly practical embodiment thereof. I have not attempted to illustrate or describe other embodiments or adaptations as it is believed that this disclosure will enable those skilled in the art to embody or adapt my invention as may be desired.

Having thus described my invention, what I claim as new and desire to secure by Letters Patent is:

1. An arm rest comprising a base of downwardly facing channel section adapted to embrace a longitudinally extending raised portion of a motor vehicle body structure, the base having an upwardly facing recess at its front end, a rearwardly inclined front top portion at the rear of the recess and a forwardly inclined rear top portion, an arm rest of downwardly facing channel section provided with a front wall, a pair of loop-like arm rest supporting links pivotally mounted on the rearwardly inclined front portion of said base and pivotally connected in parallel relation to the underside of the top of said arm rest to be swung rearwardly to an erected position or to collapse forwardly upon the base with the arm rest in embracing relation to the base and with its front wall constituting a closure for said recess, a pair of oppositely facing catches pivotally mounted on the inner side of said front wall to fit within said recess, a link pivotally connected to said catches and constituting a catch actuating finger piece which is accessable from beneath the arm rest when it is in erected position, and a spring acting to bias said catches into engagement with the forward arm rest supporting link when the arm rest is in erected position.

2. An arm rest comprising a base of downwardly facing channel section having a rearwardly inclined front portion and a forwardly inclined rear portion, upholstery on said forwardly inclined portion of said base, an arm rest of downwardly facing channel section, arm rest supporting links pivotally mounted on said base member and pivotally connected in parallel relation to said arm rest within the channel thereof to be swung rearwardly to an erected position or to collapse forwardly with the arm rest in embracing relation to the base, upholstery on top of said arm rest sloping rearwardly to adjacent the level of the front end of the upholstery on said rear portion and located adjacent thereto in the forwardly collapsed position of said arm rest, and means for releasably securing said arm rest in erected position.

3. An arm rest comprising a base having an upwardly and forwardly facing recess at its front end, a rearwardly inclined front portion behind said recess, and a forwardly inclined rear portion, an arm rest of downwardly facing transverse channel section and having a front wall, a pair of arm rest supporting links pivotally connected in parallel relation to said base and to said arm rest within the channel thereof to be swung rearwardly to an erected position or to collapse forwardly with the arm rest in embracing relation to the base and with its front end and front wall constituting a closure for said recess in said base, and a manually releasable springable catch mounted on the inner side of said arm rest front wall to automatically engage one of said links when the arm rest is swung to erected position.

4. An arm rest comprising a base having a rearwardly inclined front portion, and a forwardly inclined rear portion, upholstry on the said rear portion of said base, an arm rest of downwardly facing channel section having a front wall, a pair of arm rest supporting links pivotally connected in parallel relation to said base and arm rest and disposed between the side portions of the arm rest to be swung rearwardly to an erected position or to collapse forwardly with the arm rest in embracing relation to the base, the side portions of the arm rest being of such width as to constitute guards for substantial portions of the links when the arm rest is in erected position, and a manually releaseable springable catch mounted on the inner side of said arm rest front wall to automatically engage one of said links when the arm rest is swung to erected position said catch being housed within said arm rest in all positions thereof.

5. An arm rest comprising a base, an upholstered rear portion, an arm rest of downwardly facing transverse channel section and having a front wall across said section, a pair of arm rest supporting links pivotally connected in parallel relation to said base and arm rest and disposed between the side portions of the arm rest to be swung rearwardly to an erected position or to collapse forwardly with the arm rest in embracing relation to the base and with its rear end in aligned relation to the front end of upholstery on the rear end of said base, the side portions of the arm rest being of such width as to constitute guards for substantial portions of the links when the arm rest is in erected position, and a manually releasable springable catch mounted on the inner side of said arm rest front wall to automatically engage one of said links when the arm rest is swung to erected position.

6. An arm rest comprising a base having an upholstered rear portion, an arm rest of downwardly facing channel section, arm rest supporting links pivotally mounted on said base and pivotally connected in parallel relation to the under side of said arm rest within the channel thereof to be swung rearwardly to an erected position or to collapse forwardly into embracing relation to the base and with its rear end in aligned relation to the upholstered rear end of the base, the side portions of the arm rest being of such width as to constitute guards for substantial portions of the links when the arm rest is in erected position, and an automatically engageable manually releasable catch coacting with one of said links for supporting said arm rest in its erected position.

7. An arm rest comprising a base having an upholstered rear portion, a chambered arm rest, arm rest supporting links pivotally mounted on said base and pivotally connected in parallel relation to the under side of said arm rest to be swung rearwardly to an erected position or to collapse forwardly with its rear end in aligned relation to the upholstered rear end of the base, and a spring biased catch mounted on said arm rest at the front end thereof and within the chamber thereof and adapted to automatically engage one of said links when it is in erected position for supporting said arm rest in erected position and manually operated means associated with said catch for disengaging the same.

References Cited in the file of this patent

UNITED STATES PATENTS

| | | |
|---|---|---|
| 544,821 | Morrison | Aug. 20, 1895 |
| 736,886 | Smith | Aug. 18, 1903 |
| 1,852,465 | Mackey et al. | Apr. 5, 1932 |
| 2,337,557 | Jones | Dec. 28, 1943 |
| 2,506,156 | Long | May 2, 1950 |
| 2,658,560 | Cawthon | Nov. 10, 1953 |

FOREIGN PATENTS

| | | |
|---|---|---|
| 564,699 | France | Jan. 8, 1924 |
| 1,030,750 | France | June 16, 1953 |